United States Patent

Maekawa

[11] Patent Number: 5,548,018
[45] Date of Patent: Aug. 20, 1996

[54] AQUEOUS PRIMER COMPOSITION

[75] Inventor: Masao Maekawa, Kashiba, Japan

[73] Assignee: National Starch and Chemical Investment Holding Corporation, Wilmington, Del.

[21] Appl. No.: 445,056

[22] Filed: May 19, 1995

[30] Foreign Application Priority Data

Jun. 28, 1994 [JP] Japan .................................. 6-146742

[51] Int. Cl.$^6$ .................................................. C08L 37/00
[52] U.S. Cl. ................... 524/517; 523/408; 523/425; 523/400; 523/402; 524/519; 524/521; 524/531; 524/533; 524/534; 524/535; 524/547; 524/806; 524/858; 524/863; 524/866; 526/279
[58] Field of Search .................. 524/547, 806, 524/535, 517, 519, 521, 531, 533, 534, 858, 863, 866; 526/279; 525/288; 523/400, 402, 408, 425

[56] References Cited

U.S. PATENT DOCUMENTS

| | | | |
|---|---|---|---|
| 4,578,417 | 3/1986 | Furukawa et al. | 524/547 X |
| 4,648,904 | 3/1987 | DePasquale et al. | 106/2 |
| 4,853,438 | 8/1989 | Bernhardt et al. | 525/326.5 |
| 4,983,699 | 1/1991 | Dana et al. | 526/240 |
| 4,987,178 | 1/1991 | Shibata et al. | 524/547 |
| 5,198,503 | 3/1993 | Numa et al. | 525/288 |
| 5,240,992 | 8/1993 | Yamaya | 524/547 X |
| 5,288,771 | 2/1994 | Takaya et al. | 526/279 X |
| 5,322,890 | 6/1994 | Ando et al. | 524/547 X |
| 5,332,766 | 7/1994 | Takaya et al. | 524/547 X |
| 5,387,643 | 2/1995 | Maegawa | 524/804 |
| 5,387,663 | 2/1995 | McGee et al. | 526/279 |
| 5,436,307 | 7/1995 | Katsushima | 526/279 |
| 5,455,299 | 10/1995 | Maegawa | 524/806 |

FOREIGN PATENT DOCUMENTS

| | | | |
|---|---|---|---|
| 0251166A1 | 1/1988 | European Pat. Off. | |
| 1007360 | 1/1986 | Japan | 524/806 |
| 2156362 | 7/1987 | Japan | 524/535 |
| 3229766A | 10/1991 | Japan | |
| 4154874A | 5/1992 | Japan | |
| 5031459A | 2/1993 | Japan | |

*Primary Examiner*—Judy M. Reddick
*Attorney, Agent, or Firm*—Ellen T. Dec

[57] ABSTRACT

An aqueous primer composition comprising a copolymer wherein a cationic monomer, a specific alkoxysilane monomer, a silane macromonomer and an ethylenically unsaturated monomer are contained in aqueous medium. For this reason, regardless of the alkalinity of the substrate, the aqueous primer composition can form a highly water-resistant, alkali-resistant, tough film. Furthermore, compared with the prior art, a higher concentration and a lower viscosity, so that the resulting primer composition shows excellent penetration into the substrate at high concentration and provides for sufficient substrate-reinforcing and waterproofing effects. Moreover, when forming a film thereby and forming a finish layer thereon, this composition shows a high affinity for the top coating or adhesive to insure a firm integration of the finish layer with the substrate surface.

2 Claims, No Drawings

AQUEOUS PRIMER COMPOSITION

TECHNICAL FIELD

This invention relates to an aqueous primer composition for use in surface modification of porous alkaline inorganic substrates such as concrete, mortar or calcium silicate boards, among other materials.

BACKGROUND ART

Inorganic building materials such as concrete, mortar and slate boards or tiles have fragile surface layers and it is common practice to prime their surfaces for surface reinforcing and improving their bonding and adhesive affinities for finish coatings. As a primer for such purposes, a primer composition comprising a synthetic polymer dissolved in an organic solvent has been in broad use. However, containing an organic solvent which is volatile, any primer of this type is not acceptable from safety and hygienic points of view, for the solvent vapor is liable to catch fire and on inhalation exerts ill effects on human health. Under the circumstances, the present applicant previously developed a water-based or aqueous primer not containing an organic solvent and filed a patent application (JP Application S-62-80694). Following the development of that primer, as an improved version thereof, the applicant further developed a one-part type aqueous primer composition, which is obtainable by copolymerizing a dimethylaminoalkylacrylamide or dimethylaminoalkylmethacrylamide-epichlorohydrin adduct with an alkoxysilane and which provides an aqueous resin system exerting a powerful reinforcing effect on the substrate surface layer on crosslinking regardless of the alkalinity of the substrate, and filed a patent application (JP Application H-3-229766).

However, the crosslinkable monomer used as a comonomer unit of the above aqueous primer is a per se hydrophilic monomer and since some of the functional groups remain uncrosslinked and hydrophilic in the dried film, the primer is not as satisfactory as a solvent-based primer in the water resistance and water tightness of the film.

OBJECT OF THE INVENTION

Developed under the circumstances, this invention has for its object to provide an aqueous primer composition fully emulating a solvent-based primer in the degrees of substrate penetration, substrate-reinforcing effect, water resistance, waterproofness, and durability.

DISCLOSURE OF INVENTION

To accomplish the above object, this invention is directed, in a first aspect, to an aqueous primer composition comprising a copolymer composed of the following materials (A), (B), (C) and (D), wherein the structural unit derived from said (A) accounts for not less than 5 weight % of said copolymer, the structural unit derived from said (B) accounts for not less than 0.5 weight % of said copolymer, the structural unit derived from said (C) accounts for not less than 0.5 weight % of said copolymer, and the structural unit derived from said (D) accounts for not more than 94 weight % of said copolymer.

(A) A cationic monomer of the following general formula (1):

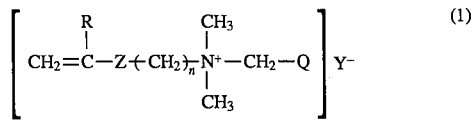

wherein R: —H or —CH$_3$

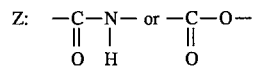

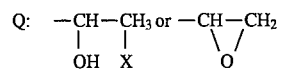

provided that X represents a hologen atom

Y: an organic or inorganic monovalent anion n: an integer of 1–3

(B) An alkoxysilane monomer of the following general formula (2):

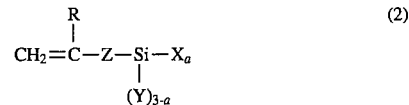

wherein R: —H or —CH$_3$

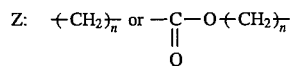

provided that n represents an integer of 0–3

X: —OCH$_3$, —OC$_2$H$_5$ or —O$\pmb{\mathrm{-(CH_2-)_m}}$O(CH$_2$$\pmb{\mathrm{-)_p}}$H provided that m and p represent an integer of 1–3 respectively Y: —(CH$_2$—)$_q$H provided that q represents an integer of 0–3 a: an integer of 1–3

(C) A silane macromonomer of the following general formula (3); and

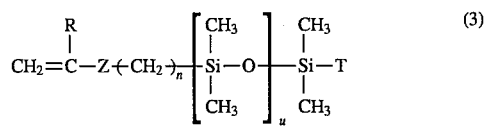

wherein R: —H or —CH$_3$

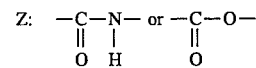

n: an integer of 1–3

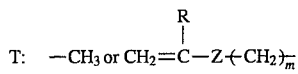

provided that m represents an integer of 1–3 u: an integer of 10–140

(D) an ethylenically unsaturated monomer.

This invention is directed, in a second aspect, to an aqueous primer composition comprising a polymer of an ethylenically unsaturated monomer as dispersed in the aqueous primer composition according to the first aspect of this invention.

The inventor of this invention did a series of exploratory studies on water-soluble resins, inter alia acrylic resins, for developing an aqueous primer composition capable of forming a tough, durable film regardless of the kind of substrate and providing for a high degree of water resistance. As a consequence, the inventor discovered that when said specified monomers (A, B and C) of general formula (1), (2) and (3) are copolymerized with said ethylenically unsaturated monomer (D) in specified proportions, the resulting linear polymer is well soluble in water and an aqueous solution thereof is capable of penetrating well into the surface layer of a substrate to reinforce the substrate surface to a high degree of strength and the dry film obtained is equivalent to the film of an organic solvent-based primer in water resistance and waterproofness. The inventor further found that owing to the cationic nature of said cationic monomer of general formula (1), the film shows high bonding and adhesive affinities for finish coats from top coatings or for adhesive layers.

It was found, at the same time, that similar effects can be achieved by polymerizing said ethylenically unsaturated monomer alone by emulsion polymerization or other technique and mixing the resulting polymer with a solution of said polymer comprising A+B+C+D.

This invention is now described in detail.

The optimum medium for use in this invention is water. However, it is not objectionable to concomitantly use an organic solvent which is readily soluble in water for the purpose of increasing the solubility of the cationic alkali-crosslinkable monomer to be copolymerized or enhancing the penetration of the composition into the substrate. It is also possible to employ, in lieu of water, only an organic solvent readily soluble in water. The organic solvent that can be used includes methanol, ethanol, propanol, acetone, methyl ethyl ketone, dioxane, ethylene glycol, propylene glycol, glycerine, methylcarbitol, ethylcarbitol, butylcarbitol, methylcellosolve, ethylcellosolve, acetic acid, and acetic acid esters of the alcohols mentioned above, and the like. When such an organic solvent is used concomitantly, it is recommendable, for safety reasons, to use it in a proportion of not more than 50 weight % (hereinafter referred to simply as %), preferably not more than 20%, based on the total amount of the medium. When such an organic solvent is used, it may be recovered by, for example, distillation after completion of the polymerization reaction.

The cationic monomer (A) of general formula (1) includes dimethylaminomethylacrylamide-epichlorohydrin adduct halides, dimethylaminomethylmethacrylamide-epichlorohydrin adduct halides, dimethylaminopropylacrylamide-epichlorohydrin adduct halides and alkylsulfonates, dimethylaminopropylmethacrylamide-epichlorohydrin adduct halides and alkylsulfonates, dimethylaminomethyl acrylate-epichlorohydrin adduct halides, dimethylaminomethyl methacrylate-epichlorohydrin adduct halides, dimethylaminopropyl acrylate-epichlorohydrin adduct halides and alkylsulfonates, dimethylaminopropyl methacrylate-epichlorohydrin adduct halides and alkylsulfonates, and the corresponding epoxides and the like. In particular, the use of a dimethylaminopropylacrylamide-epichlorohydrin adduct halide, a dimethylaminopropylmethacrylamide-epichlorohydrin adduct halide, a dimethylaminopropylacrylate-epichlorohydrin adduct halide, or a dimethylaminopropylmethacrylate-epichlorohydrin adduct halide is preferred in view of the high film strength and high adhesive affinity for top coatings and adhesives that can be attained.

It is necessary that the above cationic monomer (A) be polymerized in a proportion of not less than 5% relative to the total monomer (A+B+C+D), preferably 8 to 15%. Thus, if the proportion of the cationic monomer (A) is less than 5%, the film strength and adhesive affinity for top coatings and adhesives will be inadequate.

The alkoxysilane monomer (B) of general formula (2) includes 3-methacryloxypropyltrimethoxysilane, vinyltrimethoxysilane, vinyltriethoxysilane, vinyltrimethoxyethoxysilane, 3-methacryloxypropyltriethoxysilane, vinylmethyldimethoxysilane, vinylmethyldiethoxysilane, vinyltetramethylenetrimethoxysilane, vinyloctamethylenetrimethoxysilane, allyltrimethoxysilane, and allyltriethoxysilane, and the like. In particular, 3-methacryloxypropyltrimethoxysilane, vinyltrimethoxysilane, vinyltriethoxysilane, and vinyltrimethoxyethoxysilane are preferred in terms of water resistance, waterproofness, strength, and adhesion to top coats and adhesive layers. The alkoxysilane monomer (B) mentioned above must be copolymerized in a proportion of not less than 0.5% relative to the total monomer (A+B+C+D), preferably 1 to 10%. Thus, if the proportion of the alkoxysilane monomer (B) is less than 0.5%, the resulting film will be inadequate in water resistance, waterproofness, strength, and adhesion to top coatings and adhesives just as it is true with said cationic monomer (A).

The silane macromonomer (C) of the general formula (3) to be copolymerized with said (A) and (B) includes, for example, methacryloxy propyl dimethyl siloxane macromonomer, dimethacryloxy propyl dimethyl siloxane macromonomer and the like. It is preferable to employ such silane macromonomer as having its molecular weight of 800 to 30,000, more preferably 1,000 to 10,000. Thus, if the molecular weight is less than 800, the resulting film will be inadequate in water resistance and water-proofness. In the meantime, if the molecular weight is over 30,000, the copolymerization with other monomer deteriorates, and further the resulting film will be inadequate in adhesion to top coatings and adhesives. It is necessary that the above silane macromonomer (C) be polymerized in a proportion of not less than 0.5% relative to the total monomer (A+B+C+D), more preferably 1 to 10%. Thus, if the proportion of the silane macromonomer (C) is less than 0.5%, the resulting film will be inadequate in water resistance, waterproofness, strength, and adhesion to top coatings and adhesives just as it is true with said cationic monomer (A).

The ethylenically unsaturated monomer (D) to be copolymerized with said (A) and (C) includes hydrophobic monomers such as vinyl acetate, alkyl esters acrylate/methacrylate, styrene, acrylonitrile, methacrylonitrile and so on. These monomers can be used singly or in combination. Meanwhile, in preparing said polymer of ethylenically unsaturated monomer, a hydrophilic monomer, e.g. acrylic acid, methacrylic acid, amides of acrylic acid/methacrylic acid, methylolated amides, alkoxymethylated amides, alkylamino esters, vinyl monochloroacetate, 1-chloro-2-hydroxypropyl acrylate, etc. is used in combination with said hydrophobic monomer. These monomers can also be used singly or in combination. Among said ethylenically unsaturated monomers, acrylic acid, methacrylic acid, amides of acrylic acid or methacrylic acid and methylolated amides are particularly preferred in that they are superior in copolymerizability. When (1) said ethylenically unsaturated monomer is copolymerized with said A, B and C or (2) apart from the above A, B and C, said ethylenically unsaturated monomer is emulsion-polymerized alone to provide a polymer (emulsion) and the resulting copolymer is mixed with a medium containing a copolymer of A+B+C+D, a further improvement is obtained in the bonding and adhesive affinities for the substrate surface and to the top coat or the adhesive layer. However, since it is not easy to evenly admix the copolymer of A+B+C+D with the polymer (emulsion) of said ethylenically unsaturated monomer, it is recommendable to copolymerize the four monomers (A, B, C and D). And in the case of (1), it is necessary that said ethylenically unsaturated monomer (D) be polymerized in a proportion of not more than 94% based on the total monomer (A+B+C+D), more preferably 65 to 90%. In the case of (2), the polymer (emulsion) (X) prepared from said ethylenically unsaturated monomer is preferably formulated with the medium containing said copolymer consisting of A+B+C+D (Y) in a ratio of X/Y=0/100–90/10, more preferably X/Y= 10/30–30/10.

The aqueous primer composition of this invention can be prepared using said medium, monomers (A–D), by the following procedure, for instance. Thus, a polymerization initiator is first added to the polymerization reaction medium, viz. water, an organic solvent, or a mixture of water and an organic solvent, and while the resulting system is kept acidic with an acid, said cationic monomer (A), alkoxysilane monomer (B), silane macromonomer (C) and ethylenically unsaturated monomer (D) are added dropwise over 1–5 hours at 60°–90° C. for polymerization. If necessary, a chain transfer agent such as dodecylmercaptan, 2-mercaptoethanol or the like is added beforehand for molecular weight adjustment. Moreover, after polymerization, a variety of additives such as auxiliary film-forming agents, e.g. butylcellosolve, butylcarbitol, butylcellosolve acetate, etc., antifoams, coloring agents, antithickening agents, etc. can be added. The objective aqueous primer composition can be obtained in the described manner.

When an ethylenically unsaturated monomer is independently emulsion-polymerized alone, a polymer (emulsion) can be obtained by the conventional emulsion polymerization technology, for example by polymerizing the ethylenically unsaturated monomer with a polymerization initiator in the presence of an emulsifier and water. This emulsion is mixed with the medium containing the above-mentioned copolymer [the copolymer composed of A+B+C+ethylenically unsaturated monomer (C)+D] to give the objective aqueous primer composition.

In the above production procedure, a medium which does not interfere with the polymerization reaction should be selectively employed. As the above-mentioned polymerization initiator, azobisisobutyronitrile, benzoyl peroxide, 2,2'-azobisaminodipropane hydrochloride, ammonium persulfate, and potassium persulfate, and the like, can be mentioned. It is also important to keep said medium acidic in order to prevent gelation of the polymerization system. The acid that can be used for this pH control includes organic acids such as formic acid, acetic acid, oxalic acid, etc. and in organic acids such as hydrochloric acid, sulfuric acid, nitric acid, etc.

The aqueous primer composition of this invention as prepared in the above manner is applied, as a primer, to the surface of a substrate which includes inorganic building materials such as concrete, mortar, slate, calcium silicate, and aggregate light-weight concrete (ALC boards), among other substrates. The primer composition so applied penetrates rapidly into the surface layer of the substrate and, as the functional groups activated by alkali and water crosslink in the drying step, turns into a tough, durable three-dimensional network film with high water resistance and alkali resistance. As a result, the substrate is reinforced with toughness and durability comparable to those obtainable with an organic solvent-based primer. Moreover, since the aqueous primer composition of this invention employs a hydrophilic medium, the problem associated with the vaporization and emanation of a toxic solvent is obviated and, therefore, this composition is excellent in safety and in the prevention of pollution and, hence, of great practical value. Furthermore, the aqueous primer composition of this invention contains a cationic moiety and, because of its cationic property, shows high bonding and adhesive affinities for the top coat or adhesive layer, thus insuring a firm integrity of the product. It should be understood that the substrate for the aqueous primer composition of this invention not only includes the above-mentioned in organic building materials but also plastic and other substrates.

The reason why the aqueous primer composition of this invention gives a highly water-resistant, tough film is supposed to be as follows. Thus, the polymer segment derived from the cationic monomer (A) of general formula (1) is activated by the alkali contained in the substrate in a basic environment to crosslink the linear polymer and, thereby, gives rise to a three-dimensional network film. On the other hand, the polymer segment derived from the alkoxysilane monomer (B) of general formula (2) is caused to undergo hydrolysis of the alkoxy group by the water present in the aqueous solution and the resulting hydrolysate undergoes crosslinking on evaporation of water in the course of drying in situ of the aqueous composition to thereby provide a three-dimensional network structure like that described above. Furthermore, the silane macromonomer (C) of general formula (3) is a monomer showing strong water repellency since it has a great amount of methyl groups at both ends of a long chain of siloxane coupling to further enhance the water resistance of the three-dimensional film. Therefore, when the aqueous primer composition of this invention is coated on a substrate, the crosslinking reaction involving the segment derived from said cationic monomer (A) and the crosslinking reaction involving the segment derived from said alkoxysilane monomer (B) result in a synergistically increased crosslink density to reinforce the substrate surface to a high degree of strength and, at the same time, improve the water resistance and waterproofness of the film. And by copolymerizing the silane macromonomer having strong water repellency, the water resistance and waterproofness of the film are further increased.

EFFECT OF INVENTION

As mentioned above, the aqueous primer composition of this invention contains a copolymer consisting of said monomers (segment A–segment D) in specified proportions and, as such, undergoes crosslinking, regardless of the alkalinity of the substrate, to form a highly water-resistant, alkali-resistant, tough film. Furthermore, compared with the prior art, a higher concentration and a lower viscosity can be attained without compromising the reaction velocity, so that the resulting primer composition shows excellent penetration into the substrate at high concentration and provides for sufficient substrate-reinforcing and water-proofing effects. Therefore, despite its being aqueous, this primer composition reinforces the substrate in a degree comparable to, or even surpassing, the reinforcing effect of the conventional organic solvent-based primer. In addition, it is safe and not a source of pollution. Moreover, this composition shows a high affinity for the top coating or adhesive to insure a firm integration of the finish layer with the substrate surface.

The following examples and comparative examples are further illustrative of this invention.

EXAMPLES 1–13 AND COMPARATIVE EXAMPLES 1–5

A four-necked flask equipped with a stirrer, thermometer and reflux condenser was charged with 86 weight parts (hereinafter referred to simply as part) of isopropyl alcohol, followed by addition of 0.9 part of azobisisobutyronitrile as the polymerization initiator, 1.0 part of laurylmercaptan as the chain transfer agent, 1.0 part of acetic acid as the pH control agent. Then, a monomer mixture of the formulation shown in Tables 1–2 was fed to a drip funnel for dropwise addition over 4 hours at the reflux temperature of isopropyl alcohol for polymerization. After completion of the reaction, the reaction mixture was ripened for a further 2 hours. To this reaction mixture was added 240 parts of water so as to evenly dissolve the resin, and the isopropyl alcohol was then recovered under reduced pressure at 65° C. The polymer-containing solution thus obtained was invariably a homogeneous solution with a polymer concentration of 30%, a viscosity of 50–300 cps (BM viscosimeter, 30° C.) and a pH value of 3.5–4.0.

TABLE 1

| | Example (parts) | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Polymerizaton formula | | | | | | | | | | | | | |
| A material | | | | | | | | | | | | | |
| N-(Dimethylaminopropyl)methacrylamide-epichlorohydrin adduct halide | 12 | 12 | 12 | 12 | 12 | 12 | 12 | 12 | 12 | 12 | 5 | 12 | 12 |
| B material | | | | | | | | | | | | | |
| 3-Methacryloxypropyltrimethoxysilane | 0.5 | 0.5 | 0.5 | 0.5 | 0.5 | 0.5 | 2.5 | 5 | 2.5 | 2.5 | 0.5 | 0.5 | 0.5 |
| C material | | | | | | | | | | | | | |
| FM0711 *1 | — | — | — | — | — | — | — | — | 0.5 | 10 | — | 5 | — |
| FM0725 *2 | 0.5 | 5 | 10 | — | — | — | 5 | 5 | — | — | — | 5 | 5 |
| OFS504 *3 | — | — | — | 0.5 | 5 | 10 | — | — | — | — | 0.5 | — | 5 |
| D material | | | | | | | | | | | | | |
| Methyl methacrylate | 42 | 37.5 | 32.5 | 47 | 42.5 | 37.5 | 35.5 | 33 | 40 | 30.5 | 54 | 32.5 | 32.5 |
| Butyl acrylate | 20 | 20 | 20 | 20 | 20 | 20 | 20 | 20 | 20 | 20 | 20 | 20 | 20 |
| 2-Ethylhexyl acrylate | 20 | 20 | 20 | 20 | 20 | 20 | 20 | 20 | 20 | 20 | 20 | 20 | 20 |
| Styrene | 5 | 5 | 5 | — | — | — | 5 | 5 | 5 | 5 | — | 5 | — |
| Viscosity (Cps) | 98 | 171 | 218 | 197 | 254 | 300 | 193 | 206 | 86 | 144 | 179 | 183 | 272 |
| pH | 4.0 | 3.9 | 3.8 | 4.0 | 3.9 | 3.8 | 3.8 | 3.8 | 3.9 | 3.8 | 3.7 | 3.8 | 3.8 |

N.B.
*1: Methacryloxy propyl dimethyl siloxiane macromonomer of molecular weight 1,000 (from Chisso Corporation)
*2: Methacryloxy propyl dimethyl siloxiane macromonomer of molecular weight 10,000 (from Chisso Corporation)
*3: Dimethacryloxy propyl dimethyl siloxiane macromonomer of molecular weight 1,500 (from Toray Dow Corning Silicon Corporation)

TABLE 2

| | Comparative Example (parts) | | | | |
|---|---|---|---|---|---|
| | 1 | 2 | 3 | 4 | 5 |
| Polymerizaton formula | | | | | |
| A material | | | | | |
| N-(Dimethylaminopropyl)methacrylamide-epichlorohydrin adduct halide | 12 | 3 | 5 | 3 | 3 |
| B material | | | | | |
| 3-Methacryloxypropyltrimethoxysilane | 2.5 | 2.5 | — | 2.5 | 0.5 |
| C material | | | | | |
| FM0711 *1 | — | — | — | 5 | 2 |
| FM0725 *2 | — | 5 | 5 | — | — |
| OFS504 *3 | — | — | — | — | — |
| D material | | | | | |
| Methyl methacrylate | 40.5 | 44.5 | 45 | 44.5 | 49.5 |
| Butyl acrylate | 20 | 20 | 20 | 20 | 20 |
| 2-Ethylhexyl acrylate | 20 | 20 | 20 | 20 | 20 |
| Styrene | 5 | 5 | 5 | 5 | 5 |
| Viscosity (cps) | 50 | 188 | 160 | 123 | 77 |
| pH | 3.9 | 3.5 | 3.7 | 3.5 | 3.6 |

N.B.
*1: Methacryloxy propyl dimethyl siloxiane macromonomer of molecular weight 1,000 (from Chisso Corporation)
*2: Methacryloxy propyl dimethyl siloxiane macromonomer of molecular weight 10,000 (from Chisso corporation)
*3: Dimethacryloxy propyl dimethyl siloxiane macromonomer of molecular weight 1,500 (from Toray Dow Corning Silicon Corporation)

These compositions according to Examples and Comparative Examples were respectively adjusted to a concentration of 15% and coated at a coverage or spread of 100 g/m² on an asbestos cement-calcium silicate board (pH 9, specific gravity 0.7) or a neutralized asbestos cement-calcium silicate board (the first-mentioned asbestos cement-calcium silicate board was sealed in dry ice and allowed to stand for 1 week unitil its pH decreased from 9 to 7) and allowed to dry at room temperature for 30 minutes. On top of the resultant coat, an acrylic paint (a top coating) was coated at a coverage of 130 g/m² and allowed to stand at room temperature for 1 week so as to dry the finish coat thoroughly. Then, the coated surface was cross-hatched, 2 mm×2 mm, to provide a total of 25 small squares per cm². An adhesive tape (Nichiban Cellophan Tape, 24 mm wide) was pressed against the surface and, then, peeled off and the small squares that remained on the substrate were counted for evaluating the dry adhesion between the primer layer and the finish coat.

In addition, after finish coat drying and before cross-hatching the surface into small squares, each specimen was immersed in hot water at 50° C. for 1 day and the hot water-withstanding adhesion of the specimen was evaluated in the same manner as above. Results of the above adhesion tests were respectively rated according to the following criteria: ⊙ 23 or more squares remained, o 20–22 squares remained, Δ 10–19 squares remained, × not more than 9 squares remained. The ratings thus obtained are also shown in Tables 3–4.

Meanwhile, the above-mentioned compositions according to Examples and Comparative Examples were respectively adjusted to a concentration of 15% and coated at a coverage of 100 g/m² on slate boards and allowed to dry at room temperature for 1 week. Then, a waterproofness test was performed in accordance with JIS A 6910. Results of the waterproofness test were rated according to the amount of penetrating water after one day on the following rating scale: ⊙ 1 cc or less, o 3 cc or less, Δ 5 cc or less, × over 5 cc. The results are also shown in Tables 3–4.

| [Formula of Emulsion A] | |
| --- | --- |
| Methyl methacrylate | 48 Parts |
| Butyl acrylate | 50 Parts |
| Dimethyldiallylammonium chloride | 2 Parts |
| Emulgen 935 (Kao Corporation) | 4 Parts |
| Water | 156 Parts |
| Ammonium persulfate | 0.3 Part |
| [General description of Emulsion A] | |
| Nonvolatile matter | 38.2% |
| Viscosity | 200 cps |
| pH | 2.8 |
| Minimum film-forming temperature | 5° C. |

Each of the aqueous primer compositions thus obtained was evaluated for its characteristics (dry and hot water-withstanding adhesion tests and waterproofness test). The results are also shown in Table 5.

TABLE 3

| | | Example | | | | | | | | | | | | |
| --- | --- | --- | --- | --- | --- | --- | --- | --- | --- | --- | --- | --- | --- | --- |
| | | 1 | 2 | 3 | 4 | 5 | 6 | 7 | 8 | 9 | 10 | 11 | 12 | 13 |
| Asbestos cement-calcium silicate board (substrate surface pH = 9) | Dry adhesion | ⊙ | ⊙ | ⊙ | ⊙ | ⊙ | ⊙ | ⊙ | ⊙ | ⊙ | ⊙ | ⊙ | ⊙ | ⊙ |
| | Hot water-withstanding adhesion | ⊙ | ⊙ | ⊙ | ⊙ | ⊙ | ⊙ | ⊙ | ⊙ | ⊙ | ⊙ | ⊙ | ⊙ | ⊙ |
| Neutralized asbestos cement-calcium silicate board (substrate surface pH = 7) | Dry adhesion | ⊙ | ⊙ | ⊙ | ⊙ | ⊙ | ⊙ | ⊙ | ⊙ | ⊙ | ⊙ | ⊙ | ⊙ | ⊙ |
| | Hot water-withstanding adhesion | ⊙ | ⊙ | ⊙ | ⊙ | ⊙ | ⊙ | ⊙ | ⊙ | ⊙ | ⊙ | ⊙ | ⊙ | ⊙ |
| Slate board | Waterproofness | ⊙ | ⊙ | ⊙ | ⊙ | ⊙ | ⊙ | ⊙ | ⊙ | ⊙ | ⊙ | ⊙ | ⊙ | ⊙ |

TABLE 4

| | | Comparative Example | | | | |
| --- | --- | --- | --- | --- | --- | --- |
| | | 1 | 2 | 3 | 4 | 5 |
| Asbestos cement-calcium silicate board (substrate surface pH = 9) | Dry adhesion | ⊙ | o | ⊙ | o | o |
| | Hot water-withstanding adhesion | ⊙ | Δ | ⊙ | × | × |
| Neutralized asbestos cement-calcium silicate board (substrate surface pH = 7) | Dry adhesion | o | o | ⊙ | o | o |
| | Hot water-withstanding adhesion | Δ | × | × | × | × |
| Slate board | Waterproofness | × | ⊙ | Δ | ⊙ | o |

It is clear from the data in Tables 3–4 that all the compositions of Examples are superior to the compositions of Comparative Examples in water resistance and waterproofness.

EXAMPLES 14–16 AND COMPARATIVE EXAMPLE 6

An emulsion polymer (Emulsion A) was prepared according to the following formula and portions of the polymer were mixed with above composition according to Example 2 in the ratios indicated in Table 5 to provide aqueous primer compositions.

TABLE 5

|  |  | Example | | | Comparative Example |
|---|---|---|---|---|---|
|  |  | 14 | 15 | 16 | 6 |
| Mixing ratio (parts) | Aqueous composition of Example 2 | 75 | 50 | 25 | — |
|  | Emulsion A | 25 | 50 | 75 | 100 |
|  | Water | 150 | 125 | 100 | 100 |
| Concentration (%) |  | 18.7 | 19.6 | 20.4 | 19.0 |
| Asbestos cement-calcium silicate board (substrate surface pH = 9) | Dry adhesion | ⊙ | ⊙ | ⊙ | X |
|  | Hot water-withstanding adhesion | ⊙ | ⊙ | ⊙ | X |
| Neutralized asbestos cement-calcium silicate board (substrate surface pH = 7) | Dry adhesion | ⊙ | ⊙ | ⊙ | X |
|  | Hot water-withstanding adhesion | ⊙ | ⊙ | ⊙ | X |
| Waterproofness | Slate board | ⊙ | ⊙ | ⊙ | X |

It is apparent from the data in Table 5 that a primer composition providing for good water resistance and waterproofness can also be obtained by preparing an insoluble polymer emulsion independently and mixing it with any of the above compositions of Examples.

What is claimed is:

1. An aqueous primer composition comprising a copolymer composed of the following materials (A), (B), (C) and (D), wherein the structural unit derived from said (A) accounts for not less than 5 weight % of said copolymer, the structural unit derived from said (B) accounts for not less than 0.5 weight % of said copolymer, the structural unit derived from said (C) accounts for not less than 0.5 weight % of said copolymer, and the structural unit derived from said (D) accounts for not more than 94 weight % of said copolymer wherein (A) is a cationic monomer of the following formula (1):

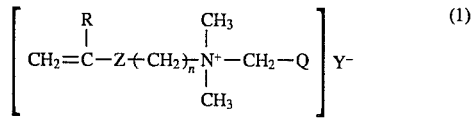

wherein R: —H or —CH$_3$

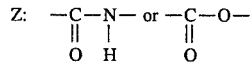

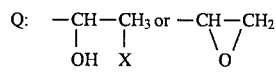

provided that X represents a halogen atom

Y: an organic or inorganic monovalent anion n: an integer of 1–3

(B) An alkoxysilane monomer of the following formula (2):

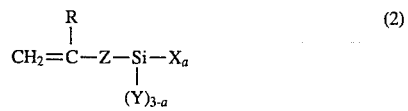

wherein R: —H or —CH$_3$

Z: $-(CH_2)_n-$ or $-\underset{\underset{O}{\|}}{C}-O-(CH_2)_n-$ provided that n represents an integer of 0–3

X: —OCH$_3$, —OC$_2$H$_5$ or —O-(CH$_2$)$_m$O(CH$_2$)$_p$H provided that m and p represent an integer of 1–3 respectively Y: —(CH$_2$)$_q$H provided that q represents an integer of 0–3 a: an integer of 1–3

(C) A silane macromonomer of the following formula (3)

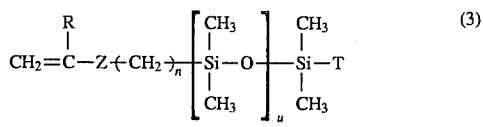

wherein R: —H or —CH$_3$

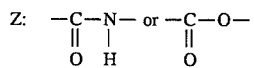

n: an integer of 1–3

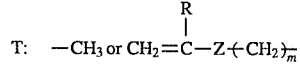

provided that m represents an integer of 1–3 u: an integer of 10–140

(D) an ethylenically unsaturated monomer.

2. An aqueous primer composition comprising a polymer of at least one ethylenically unsaturated monomer dispersed in the aqueous primer composition of claim 1.

* * * * *